United States Patent [19]

Lancaster

[11] Patent Number: 5,287,717
[45] Date of Patent: Feb. 22, 1994

[54] METHOD FOR FORMING A TANK BOTTOM

[75] Inventor: Ronald G. Lancaster, Springfield, Mo.

[73] Assignee: Custom Metalcraft, Inc., Springfield, Mo.

[21] Appl. No.: 863,721

[22] Filed: Apr. 3, 1992

[51] Int. Cl.$^5$ .................. B21D 51/16; B21D 22/20
[52] U.S. Cl. ........................... 72/332; 72/348; 72/379.4; 220/4.12
[58] Field of Search ................ 72/332, 326, 334, 347, 72/348, 379.4; 413/72–75; 83/267; 220/1.5, 571, 4.12, 601

[56] References Cited

U.S. PATENT DOCUMENTS

| | | |
|---|---|---|
| 1,235,438 | 7/1917 | Chynoweth . |
| 1,430,000 | 9/1922 | Bell . |
| 1,884,708 | 10/1932 | Jeneson ................. 72/348 |
| 2,180,185 | 11/1939 | Weiss . |
| 2,297,625 | 9/1942 | Kotcher ................. 72/347 |
| 2,339,303 | 1/1944 | Tillery . |
| 2,356,457 | 8/1944 | Gonda ................... 72/348 |
| 3,096,900 | 7/1963 | Breneman . |
| 3,186,607 | 6/1965 | Lubenow . |
| 3,344,646 | 10/1967 | Moller ................... 72/348 |
| 3,677,118 | 7/1972 | Abbott ................... 83/267 |
| 3,948,124 | 4/1976 | Dombrowski ........... 83/267 |
| 4,557,406 | 12/1985 | Olinger et al. . |
| 4,648,521 | 3/1987 | Thomas et al. . |
| 4,782,973 | 11/1988 | Wiese ................... 220/4.12 |
| 4,785,958 | 11/1988 | Snyder . |
| 4,840,284 | 6/1989 | Snyder . |
| 4,961,509 | 10/1990 | Currier ................. 220/1.5 |
| 5,005,396 | 4/1991 | DeSmet ................. 72/347 |

FOREIGN PATENT DOCUMENTS

| | | | |
|---|---|---|---|
| 1050781 | 10/1983 | U.S.S.R. ................. 72/332 |
| 2833 | of 1870 | United Kingdom ....... 72/347 |
| 428703 | 5/1935 | United Kingdom ....... 220/601 |
| 629353 | 9/1949 | United Kingdom ....... 72/326 |

*Primary Examiner*—Daniel C. Crane
*Attorney, Agent, or Firm*—Nies, Kurz, Bergert & Tamburro

[57] ABSTRACT

An improved tank configuration wherein a die is employed to stamp a formed member is disclosed. The formed member may be used as either the top or bottom head for a portable liquid container, and is constructed so that all welding is eliminated in the corner and outlet portions of the container. A trim machine is employed to remove uneven edges from the formed part. By the present invention, a stamped configuration is provided in which a draw formed tank bottom is formed so as to allow complete and full drainage of the tank bottom. The top and bottom heads are finish trimmed to exact dimensions so as to facilitate the assembly of these parts to the shell of the tank.

7 Claims, 2 Drawing Sheets

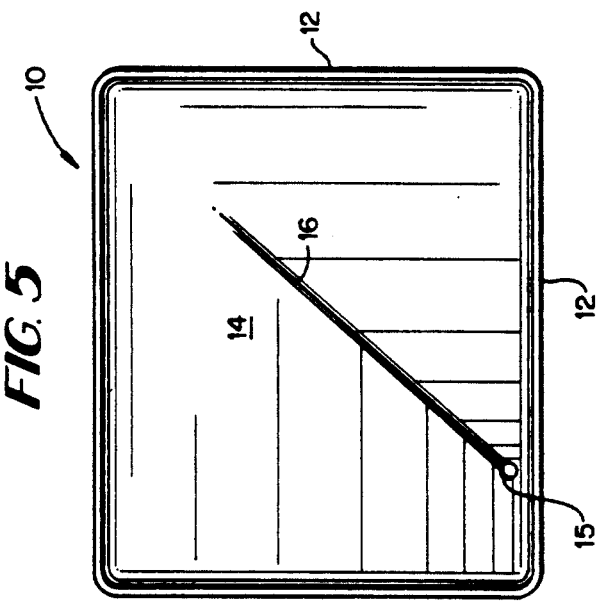
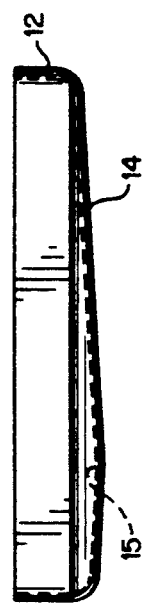
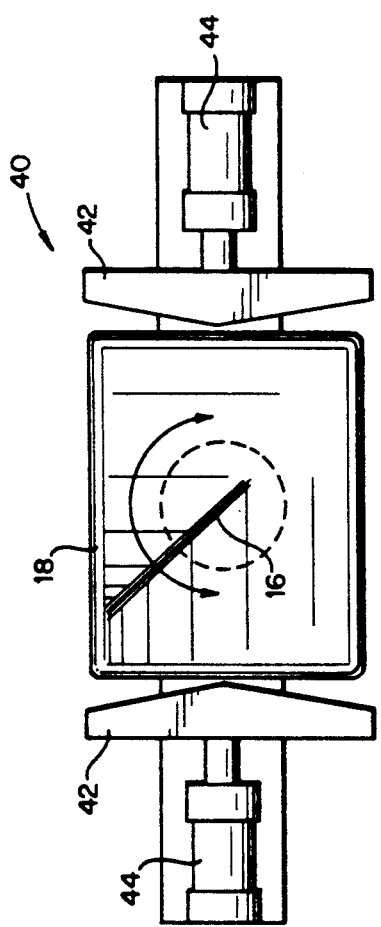
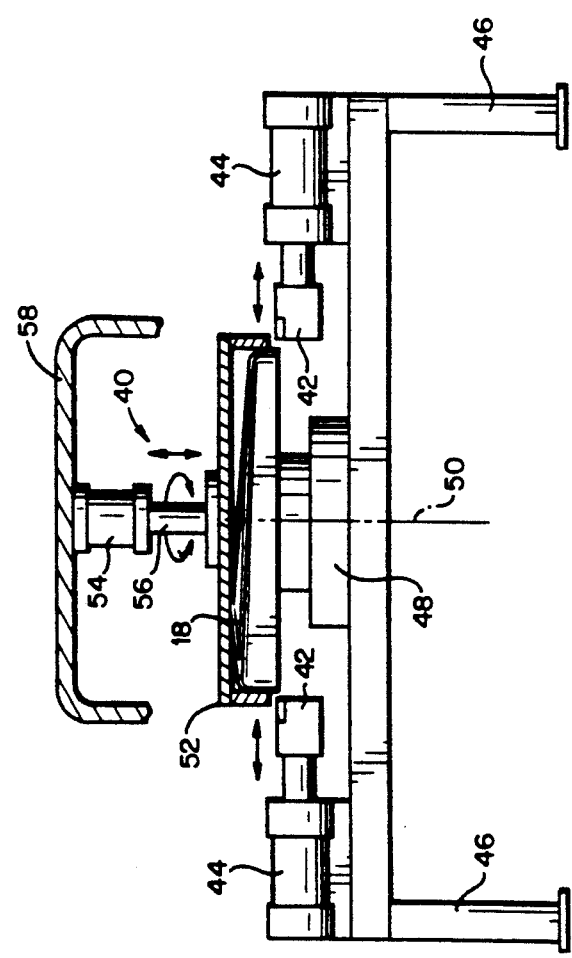

METHOD FOR FORMING A TANK BOTTOM

BACKGROUND AND SUMMARY OF THE INVENTION

The present invention relates to a portable tank having an improved bottom and top configuration. More particularly, the present invention relates to a stamped-sloped configuration for the bottom or top of a portable tank having improved features with regard to manufacture and use of the tank.

Previous portable tank configurations are described, for example, in the following U.S. Pat. Nos.: 1,235,438 to Chynoweth; 1,430,000 to Bell; 2,180,185 to Weiss; 2,339,303 to Tillery; 3,096,900 to Breneman; 3,186,607 to Lubenow; 4,648,521 to Thomas et. al.; 4,840,284 to Snyder; 4,557,406 to Olinger et al.; and 4,785,958 to Snyder.

By the present invention, there is provided an improved tank configuration with regard to the bottom and top portions thereof, wherein a die is employed to stamp a formed member which may be employed as either the top or the bottom head for a portable container, and which is constructed so that all welding is eliminated in the corner and outlet portions of the container. A trim machine is employed to remove uneven edges from the formed part.

Accordingly, it is an object of the present invention to provide a stamped configuration in which a draw formed tank bottom is formed so as to allow complete and full drainage of the tank bottom.

It is another object of the invention to provide an improved tank bottom and top configuration in which all welded corner inserts are eliminated.

It is a further object of the invention to allow the top and bottom heads of a portable container to be finish trimmed to exact dimensions so as to facilitate the assembly of these parts to the shell of the tank.

BRIEF DESCRIPTION OF THE DRAWINGS

FIG. 3 is a plan view of a trim machine for use in trimming the edges of the formed head.

FIG. 4 is a side elevation of the trim machine of FIG. 3.

FIG. 5 is a plan view showing the draw formed head of the present invention.

FIG. 6 is a side elevation of the draw formed head of FIG. 5.

DESCRIPTION OF THE PREFERRED EMBODIMENTS

In the embodiment of the invention as shown in FIGS. 1 through 6, there is provided a tank bottom or tank top 10 having side wall portions 12 and a bottom portion 14. A single upward crease 16 is employed to stiffen the bottom when such a bottom is required. The crease 16 is not required on all bottoms and is optional in the present invention.

Figure 1:
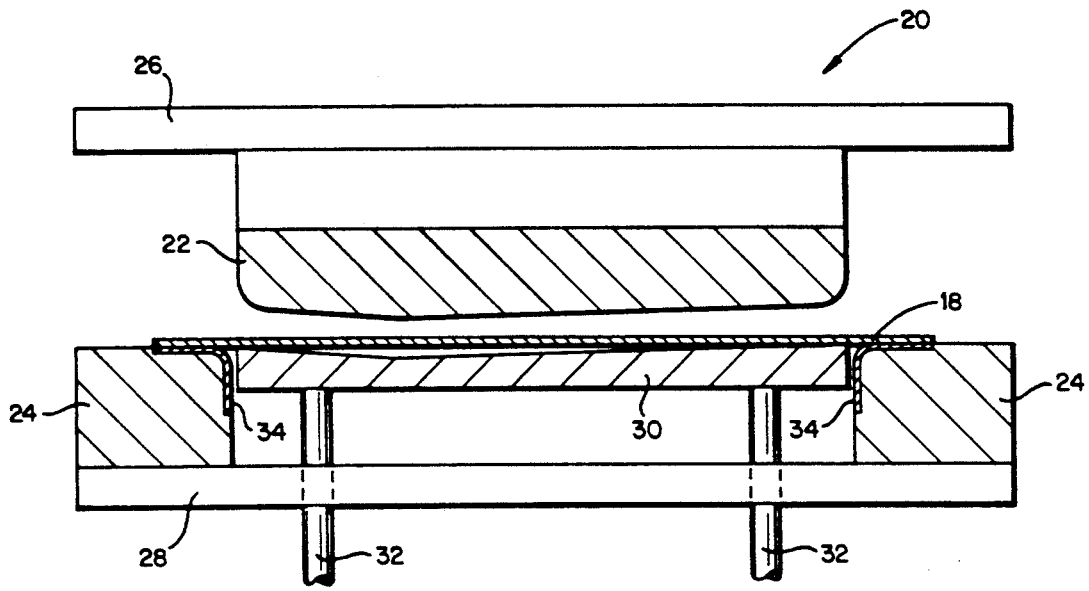
FIG. 1 is a side elevation showing the unformed top or bottom head of a container as a flat sheet positioned in the head forming die which is in the open position.

The tank bottom or top 10 is formed initially from a flat, generally rectangular sheet 18 of metal or similar material as shown in FIG. 1, with the sheet 18 being positioned in a head forming die 20 having punch 22 and die 24 members. In preparing the flat sheet 18 for the form die 20, the corners of the sheet 18 are trimmed off along a line which is approximately equal to the diameter of the curved corners of the finished tank bottom or top 10. Such initial trimming of the sheet 18 assists in producing smooth pan-shaped corner surfaces for the formed piece.

A top die shoe 26 and bottom die shoe 28 extend across the upper and lower portions of the head forming die 20 and a cushion back-up 30 with attached cushion pins 32 serve to support the sheet 8 during the forming steps. The cushion back-up 30 is of a concave configuration in its upper surface to mate with the eventual downwardly convex shape of the formed head adjacent to the drain opening 15.

Along the inner side surfaces of the die 24 are located insert members 34 which serve to prevent undue stretching, tearing or galling of the sheet material 18 while the material 18 is being drawn through the die 20. The insert members 34 are formed of bronze or similar material.

Figure 2:
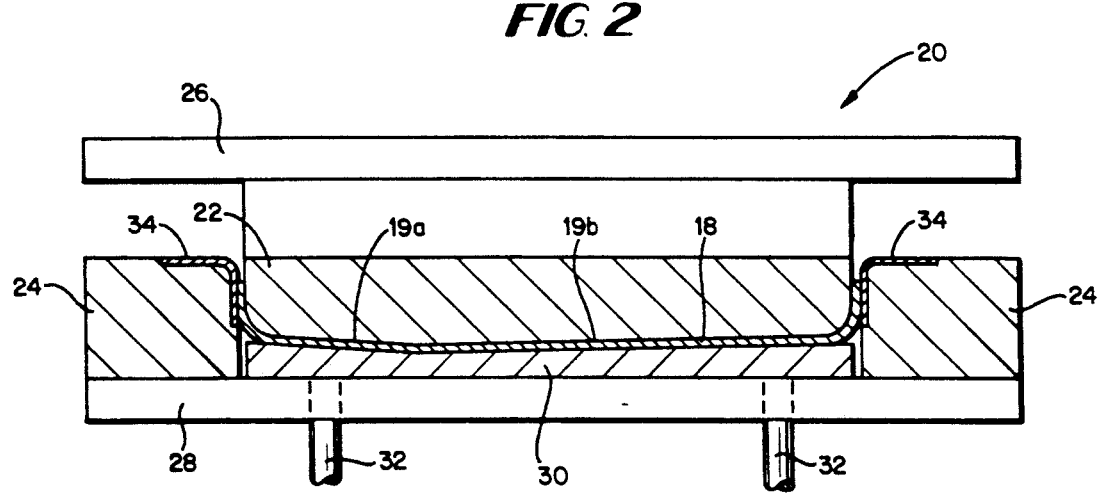
FIG. 2 is a side elevation similar to FIG. 1, showing the head which has now been formed, with the head forming die in the closed position.

Upon being formed as shown in FIG. 2, a cross section of the formed sheet 18 shows the two downwardly sloping surfaces 19a and 19b which intersect in the region adjacent the drain opening 15 which is subsequently formed in the tank bottom, as shown in FIGS. 5 and 6. The optional upward crease 16 may be formed in the sheet material 18 by suitable provision in the forming die 20. The upward crease 16 serves to stiffen the bottom 14 rather than to assist with drainage. Thus the crease 16 helps to prevent sag when the container is filled with liquid. The crease 16 extends from the drain opening 15 generally toward the center of the bottom portion 14. The specific location of the drain opening 15, which determines the dimensions 19a and 19b, may be varied depending on the intended use of the specific container. In general, however, the bottom surface 14 will be smoothly contoured upwardly toward the side walls 12 from the region of the drain opening 15. In one embodiment of the invention, the side walls 12 were approximately 2½ inches in height and the drain opening 15 was approximately ½ inch lower than the side walls 12.

After being formed in the die 20, the material 18 is next transferred manually or by other means to the trim machine 40 of FIGS. 3 and 4. The trim machine 40 includes a pair of reciprocating shear blades 42 operated by piston and cylinder members 44 mounted on a platform 46. The formed sheet 18 is mounted on a pedestal 48 having the capability by the use of conventional equipment to rotate the formed sheet 18 by 90 degrees in either direction about its vertical axis 50.

A clamp frame 52 is mounted on a part clamp cylinder 54 and piston 56 arrangement for use in holding the formed sheet 18 during the trim operation. The cylinder 54 is fixed to a frame member 58 of the trim machine 40. The clamp frame 52 is free to rotate in conjunction with the piston 56 and thus the frame 52 will rotate with the formed sheet 18 on the pedestal 48.

The trim machine 40 operates to remove uneven edges from the formed upper side walls 12 of the sheet 18 to facilitate the merging and assembly of these side wall portions 12 with the main side walls of the tank or container.

By constructing the present invention with a one piece bottom or top configuration in a die and with final trimming of the bottom or top prior to assembly to the shell of the tank, it is seen that no notch is required for slope drainage and the creasing of the tank bottom is also not required.

When the formed piece is to be employed as a tank bottom, supporting legs may be mounted on the underside of the formed tank bottom at the four corners thereof in a conventional manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method for forming the bottom of a tank for liquids, said tank having generally upwardly extending sides and a sloped bottom for complete drainage of liquid from the tank, said method comprising the steps of:
   (a) providing a generally flat, rectangular shaped plate member having a plurality of corner portions, wherein at least one corner portion is trimmed along a line which is approximately equal to the diameter of a finished curved corner of the bottom;
   (b) positioning said plate member in a head forming device having punch and die members, and forming said plate member in said head forming device by deforming said flat plate member against said punch and die members to provide a bottom wall portion and upwardly extending side wall portions which extend continuously around the periphery of said bottom wall portion, and with an upward crease in the bottom wall portion of the plate member and a drain opening in said bottom wall portion, said bottom wall portion including a pair of downwardly sloping surfaces which slope downwardly from the side wall portions and which intersect in a region adjacent said drain opening to establish said crease so as to extend radially in a direction from said opening in an upward fashion towards said side wall portions, and with said bottom wall portion being generally contoured smoothly and continuously upwardly to the side wall portions from the entire circumference of the drain opening, thus providing a one-piece tan bottom which is formed without welding in the region adjacent said drain opening or in said corner portion.

2. The method of claim 1, including the further steps of:
   (d) positioning said formed plate member on a trim machine having cutting means; and 3. The method of claim 1 wherein the drain opening is provided in the bottom wall portion along said upward crease.

4. The method of claim 2 wherein said cutting means includes a pair of reciprocating shear blades operated by piston and cylinder members.

5. The method of claim 2 wherein the trim machine includes a pedestal on which the formed plate is mounted, said pedestal having means to rotate the formed plate by 90 degrees in either direction about a vertical axis of said formed plate.

6. The method of claim 1 wherein the die members are provided with insert members along the inner side surfaces thereof to prevent undue stretching, tearing or galling of the plate material during forming.

7. The method of claim 21, wherein the formed plate member is clamped to keep it in a stabilized position during the operation of said cutting means.

* * * * *

UNITED STATES PATENT AND TRADEMARK OFFICE
CERTIFICATE OF CORRECTION

PATENT NO. : 5,287,717
DATED : February 22, 1994
INVENTOR(S) : Ronald G. Lancaster It is certified that error appears in the above-identified patent and that said Letters Patent is hereby corrected as shown below:

```
Column 2, line 11, cancel "8", insert --18--.
Column 3, line 31, before "forming" (first occurrence)
                   insert --(c)--.
Column 4, line 11, cancel "tan", insert --tank--.
Column 4, after line 18, insert the following:
          (e) operating said cutting means of the
              trim machine to trim the side wall
              portions of said formed plate member.
Column 4, line 35, cancel "21", insert --2--.
```

Signed and Sealed this

Twelfth Day of July, 1994

Attest:

BRUCE LEHMAN

Attesting Officer        Commissioner of Patents and Trademarks